(12) United States Patent
Vallebrant

(10) Patent No.: US 7,325,477 B2
(45) Date of Patent: Feb. 5, 2008

(54) DEVICE FOR REDUCING ENERGY LOSSES IN A MACHINERY UNIT

(75) Inventor: Per-Ola Vallebrant, Trollhattan (SE)

(73) Assignee: Parker-Hannifin Corporation, Cleveland, OH (US)

( * ) Notice: Subject to any disclaimer, the term of this patent is extended or adjusted under 35 U.S.C. 154(b) by 251 days.

(21) Appl. No.: 10/533,616

(22) PCT Filed: Oct. 30, 2003

(86) PCT No.: PCT/SE03/01688

§ 371 (c)(1),
(2), (4) Date: Apr. 29, 2005

(87) PCT Pub. No.: WO2004/040170

PCT Pub. Date: May 13, 2004

(65) Prior Publication Data

US 2006/0054416 A1   Mar. 16, 2006

(30) Foreign Application Priority Data

Oct. 31, 2002  (SE) .................................. 0203222

(51) Int. Cl.
   *F01B 31/10*   (2006.01)
(52) U.S. Cl. ............................................ 92/153; 92/57

(58) Field of Classification Search .................... 92/57, 92/71, 153; 91/505
See application file for complete search history.

(56) References Cited

U.S. PATENT DOCUMENTS

| 3,625,310 | A | 12/1971 | Herrick |
| 4,414,861 | A | 11/1983 | Witt |
| 2002/0152887 | A1* | 10/2002 | Skirde et al. ................... 92/70 |

* cited by examiner

*Primary Examiner*—Michael Leslie
(74) *Attorney, Agent, or Firm*—Daniel J. Whitman

(57) ABSTRACT

The present invention relates to a device for reducing energy losses in a machinery unit (1), having at least one part (4) which is arranged to rotate in fluid about a rotation axis (6) in a substantially closed chamber (3) delimited in the radially outward direction by means of a wall (18) extending around the rotation axis. The wall (18) has a radially inward facing wall surface (10) extending wholly or partially around the revolution, which wall surface is highly smooth and extends close to, but with an interspace (14) to the radially outer surface which is generated around the revolution by the rotary part (4). The interspace is suited to minimizing the rotating fluid volume and, at the same time, maintaining necessary width for a boundary layer in the fluid between the generated surface and the wall surface.

10 Claims, 4 Drawing Sheets

DEVICE FOR REDUCING ENERGY LOSSES IN A MACHINERY UNIT

BACKGROUND OF THE INVENTION

Technicl Field

The present invention relates to a device for reducing energy losses according to the preamble to subsequent patent claim 1.

In machinery units which have parts rotating in a fluid, for example oil, energy losses arise due to the braking effect of the fluid as a result of the fluid being jointly transported in the rotation of the parts and braked by friction against rough or otherwise uneven surfaces in the chamber enclosing the fluid and the rotating parts. Examples of such machinery units are gearboxes, internal combustion engines, hydraulic motors and pumps.

In certain types of machinery units, further energy losses accrue due to the fluid being rotated in a chamber which is asymmetrical around a rotating part, such as in displacement-type hydraulic motors and pumps having a so-called driving pulley, which is angled relative to axial pistons in a cylinder drum and converts axial forces into torque and vice versa, see, for example, SE 7208028-6. As a result of this publication, it is previously known to reduce energy losses by the use of a partitioning member in the form of a radially directed, circumferential projection on the inside of the machine housing. However, the loss reduction is relatively limited due to the fact that the separated fluid continues to rotate with the rotating component and is also compressed as it rotates around, one revolution with the rotating component.

BRIEF SUMMARY OF THE INVENTION

The object of the present invention is to increase efficiency by reducing the energy losses in a machinery unit having rotating parts in fluid by virtue of the fact that, on the one hand, only a limited part of the total fluid volume is jointly transported in the rotation, whilst, at the same time, the jointly rotating volume is carried along with low friction.

Another object of the present invention is achieved by means of a device, including one part which is arranged to rotate in fluid about a rotation axis in a substantially closed chamber delimited in the radially outward direction by means of a wall extending around the rotation axis, wherein in the wall has a radially inward facing wall surface extending wholly or partially around the revolution, the wall surface is a highly smooth low-friction surface against the fluid and extends close to, but with an interspace to the radially outer surface, which is generated around the revolution by the rotary part, and wherein the interspace is suited to minimizing the rotating fluid volume and, at the same time, maintaining necessary width for a boundary layer formed in the fluid between the generated surface and the wall surface.

BRIEF DESCRIPTION OF DRAWINGS

The invention will be described in greater detail below with a pair of illustrative embodiments with reference to appended drawings, in which.

DETAILED DESCRIPTION OF THE INVENTION

Figure 1:
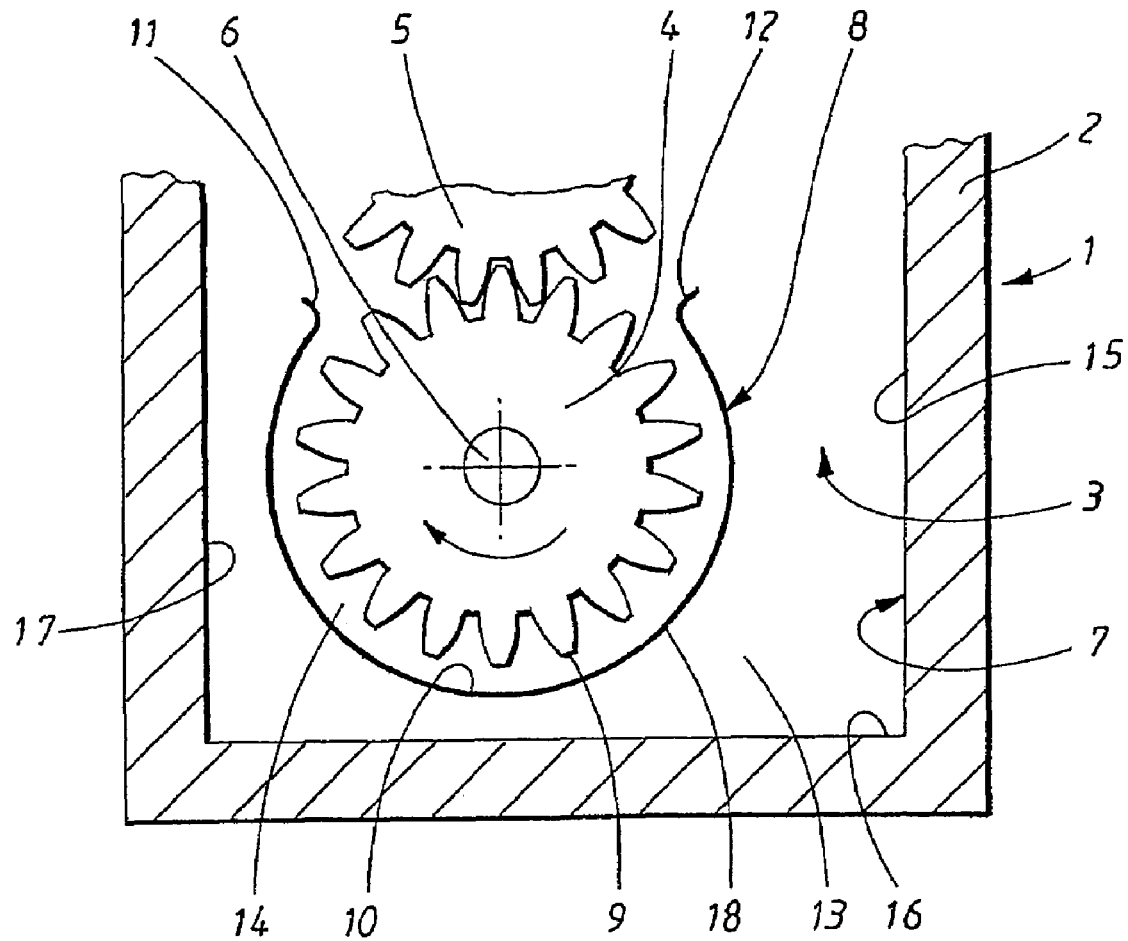
FIG. 1 shows diagrammatically a first embodiment of a device according to the invention, applied to a gearbox.

Referring to the drawings and initially FIG. 1, thus shows the device in a first embodiment in order to illustrate the principle of reducing energy losses according to the invention. FIG. 1 shows a section through a machinery unit 1, which can be constituted by, for example, a gear-tooth type gearbox having a gearbox housing 2 enclosing a chamber 3 which is wholly or partially filled with a fluid, such as oil, whose task is to reduce friction between metal parts and counteract wear and tear, and also, in many cases, to cool. Depending on a number of factors, such as the viscosity of the fluid and the character of the chamber, the fluid does, however, involve energy losses as a result of the fluid countering the torque which is applied to the rotating parts in the machinery unit. As shown in FIG. 1, these are constituted by gear wheels 4, 5, one of which is shown in its entirety. This is rotatable relative to a rotation axis 6, either by the gear wheel being fitted non-rotatably to the shaft and driven around the second by the gear wheel 5, with which the gear wheel 4 is meshed. As a result, particularly, of deformation of the gear wheels in the course of the rotation revolution, i.e. deviation from a smooth cylinder jacket surface, the fluid, to a great extent, is rotated with the gear wheels. In the case of a conventional gearbox, the whole of the fluid volume is rotated and, at the same time, with its outer sections, is braked by the inner walls of the gearbox housing 2, which walls usually have a certain coarseness due, for example, to the chosen production method, such as casting. Apart from the surface structure of the inner wall of the housing 2, a non-rotationally-symmetric volume of the chamber 3, in this case an angular or rectangular cross-sectional form, means that the jointly transported fluid is subjected to a local increase in pressure in the narrower portions, similar to a restriction in a pipe, thereby resulting in further energy losses.

According to the invention, a screening member 8 is therefore provided, in the form of a screen wall which, as shown in FIG. 1, extends partially around at least one of the rotary parts, i.e., in FIG. 1, the gear wheel 4 and the rotation axis 6. The screen wall is substantially in the shape of a cylinder jacket and extends relatively close to the tooth tips 9 of the gear wheel, yet such that a radial interspace in the form of a gap is formed between the tooth tips and the radially inward facing surface 10 of the screen wall, which surface is highly smooth so as to create as little friction as possible against the enclosed fluid. The screen wall is closed off along two transverse edges 11, 12, which, in this case, are bent radially outward. In the illustrated example, the screen wall is expediently unaltered in its section viewed transversely to the plane of the paper, but can have edges which separate the teeth also in the axial direction so as further to reduce the losses. The chamber 3 in the housing 2 is thereby divided into a, relative to the rotation axis 6, radially outer part-chamber 13 and radially inner part-chamber 14. Apart from by opposite end walls and top wall (not shown), the outer part-chamber 13 is limited by the wall sides 15, 16, 17 of the housing and by the outside 18 of the screen wall 8, which latter, as shown in FIG. 1, is likewise in the shape of a cylinder jacket, since the screen wall is realized in a suitable uniformly thick yet relatively thin material, for example steel plating, which is bent into the desired shape. The inner part-chamber 14 is likewise delimited, apart from by end walls (not shown), by the inside or inner surface 10 of the screen wall, which produces low friction against the fluid, and by the surfaces of the rotary parts 4, 6 if the part-chamber is herein regarded as the chamber which can be filled by the particular fluid, i.e. oil.

The arrangement in which the smooth wall surface 10 is situated at an optimal distance from the rotating part 4 thus produces, as a result of the previously described division of the fluid chamber according to FIG. 1, an outer part-chamber which has no rotating parts and an inner part-chamber 14 which encloses rotating parts, thereby reducing energy losses incurred due to the action of the fluid. The fluid in the inner part-chamber is jointly rotated, in fact, together with the rotating parts with minimal friction and pressure-change losses, whilst, at the same time, the fluid in the outer chamber is separated from the rotating parts and is not forced to flow along the inner walls of the housing, but rather, in an extreme case, is kept almost stationary. The jointly rotating fluid volume thus flows around along the smooth inside 10 of the screen wall 8, which smooth inside extends in a rotationally symmetrical manner around the rotation axis 6 up to its end edges 11, 12. A certain exchange and overflow occurs between the fluid volume in the inner part-chamber 14 and the outer part-chamber 13 and is necessary to maintaining the properties of the oil, i.e. too low a fluid volume, such as the volume in the inner chamber 14, produces an inadequate working life for the oil, i.e. demands unfavorably short oil change intervals, in addition to which energy losses in the exchange might need to be evacuated with the oil.

Figure 2:
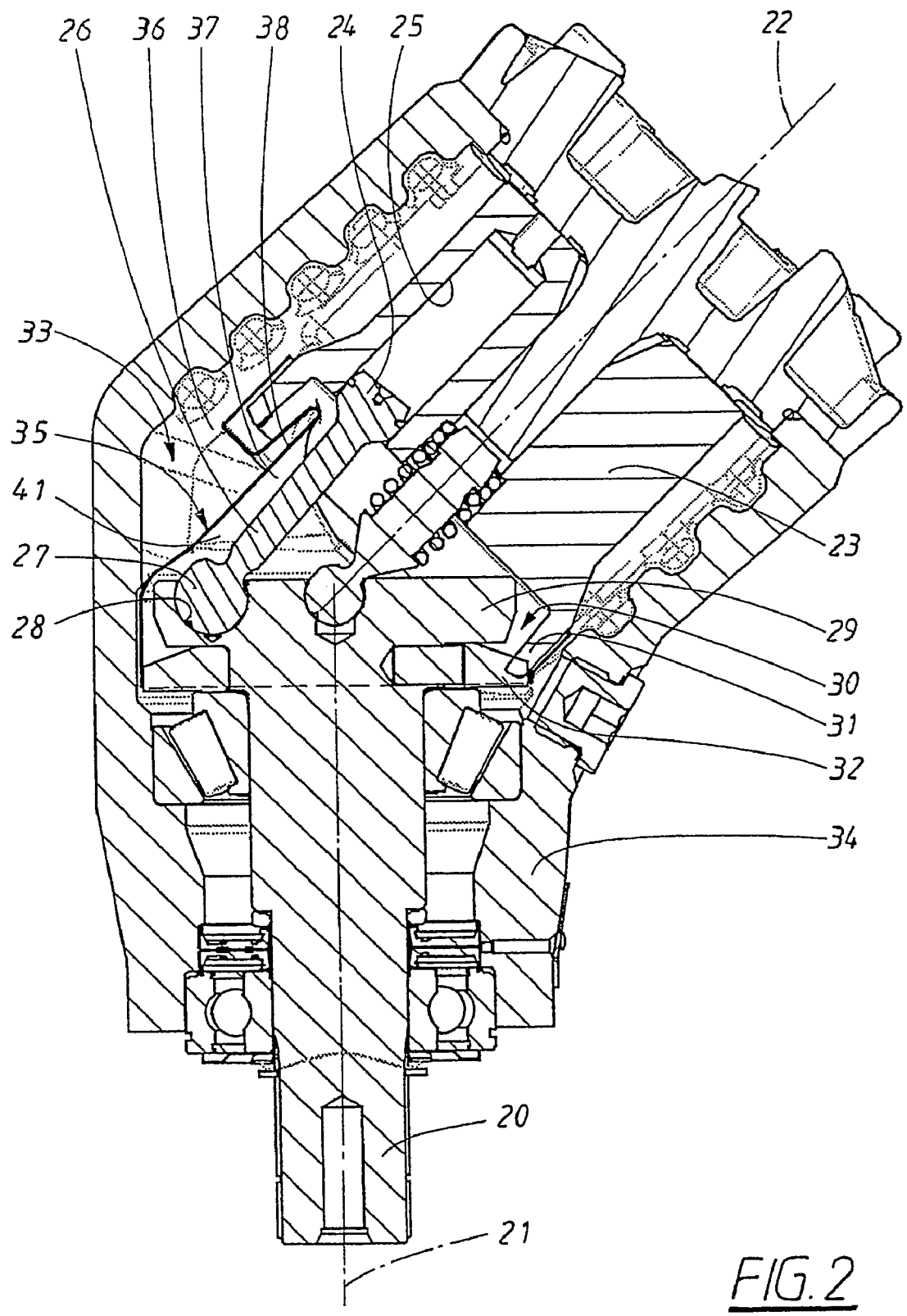
FIG. 2 shows a longitudinal section through a hydraulic pump/motor provided with a device according to the invention in a second embodiment.

The second embodiment of the screening member according to the invention will now be described with reference to FIGS. 2-6. This second embodiment is intended to reduce energy losses in a hydraulic pump or motor, which, in FIG. 2, is of a type described in the applicant's own patent publication WO99/30034. This hydraulic machine is of the displacement type, more precisely of the "bent axis" type, in which the drive shaft 20 of the machine has a rotation axis 21 which is angled toward a second rotation axis 22, about which a cylinder drum 23 is intended to rotate together with a number of, for example five, axial pistons 24, which move to and fro, i.e. reciprocally, in their respective cylinder bores 25, which latter extend parallel with the second rotation axis 22 and are arranged in a circle viewed from the ends of the cylinder drum 23. As a result of the odd number of cylinder bores and pistons as illustrated in FIG. 2, and the regular distribution thereof, the cylinder bores are not arranged opposite one another in pairs, so that only one cylinder bore is seen in FIG. 2. A hydraulic pump or motor having an even number of cylinder bores, such as six or eight, with cylinder bores arranged diametrically opposite one another in pairs, is shown, for the sake of clarity, in part-section in FIG. 6. With reference to both FIGS. 2 and 6, it can be seen that the axial pistons extend out through one end of their cylinder bores with a piston rod 26, which at its outer end transcends into a spherical head 27, which is mounted in a corresponding cup-shaped bearing 28, one bearing cup for each piston, in a driving pulley 29, which pulley is fixedly attached to the inner end of the drive shaft 20 and extends perpendicularly to the rotational axis 21 of the latter. As a result of the driving pulley 29 forming an angle to the rotation axis 22 of the cylinder drum, a rotation motion of the drive shaft 20 is created by the axial motions of the pistons, or vice versa, depending on whether the machine is constituted by a pump or a motor. Through alternate filling and emptying of the cylinder bores with hydraulic fluid, pumping action is created in a known manner in the hydraulic fluid in the case of a pump and, conversely, a torque on the drive shaft 20 in the case of a motor. In the case of a pump, a drive motor is coupled to the drive shaft 20, which, thus, is an input shaft for driving of the pump, whilst in the case of a motor a hydraulic pressure in the pressure fluid creates torque on the drive shaft 20, which here is an output shaft. The drive shaft 20 is vertical in FIG. 2, but can have any direction whatsoever, for example, as a result of the machine being mobile and assuming a different inclination during operation.

For synchronization of the rotation motions of the rotary parts, in the illustrated example a synchronizing device of the gear wheel synchronization type is provided. In this example, the synchronizing device 30 comprises, more precisely, two intermeshing gear wheels 31, 32, in which the one gear wheel 31 is fitted to the cylinder drum 23 for rotation together with the latter about its rotation axis 22, whilst the second gear wheel 32 is fixedly attached to the drive shaft 20, next to the driving pulley 29, for rotation together with the latter. All these rotary parts have surfaces which are facing toward or are located in a closed chamber 33, which is enclosed by the machine housing 34. This chamber 33 is intended to be wholly or partially filled with fluid, such as hydraulic fluid, which can be the same hydraulic fluid as included in the hydraulic system to which the machine belongs, either as a pump or as a motor. The oil or fluid in the chamber 33 is required for, in the first place, reducing the friction in contact surfaces between the moving parts, for cooling, for damping sound and for protecting against corrosion.

As a result of the moving parts executing a motion, essentially a rotation motion, the fluid is jointly transported by the moving parts. In order to reduce the resultant energy losses, in this embodiment, too, a screening member in the form of a screen wall 35 is provided, which is shown in section in FIG. 2, whilst its basic shape can best be seen from the perspective view in FIG. 3. In this embodiment, too, the screening member 35 divides the fluid chamber 33 delimited by the housing 34 into two part-chambers, on the one hand a radially outer part-chamber 36, relative to the rotation axes 21, 22, and, on the other hand, a radially inner part-chamber 37. Like the previous embodiment, the radially inner part-chamber 37 encloses the moving parts, which thus comprise the cylinder drum 23, with gear wheel 31 and axial pistons 24, and the driving pulley 29 with associated gear wheel 32. The screen wall 35 has a contour which, in this embodiment, over its longer portion, bends off both inward and outward so as to adjoin relatively closely to the moving parts without coming into contact therewith and, in this embodiment, also has a highly smooth inside or inner surface 38, i.e. a low-friction surface so as to allow the fluid to slide around along the surface with least possible friction, thereby maintaining a high Reynold's number for the flow within the device, in combination with good flow characteristics. Examples of smoothness are steel which has been lathed better than normal, for example steel plating. The screen wall is not intended to separate the two part-chambers in a seal-tight manner, however, but rather to allow a small exchange of fluid between the chambers in order to exploit the larger total volume and hence maintain the good properties of the fluid. All the same, care is taken to ensure that the fluid in the outer part-chamber 36 is kept relatively still, so that this fluid volume does not create any energy losses in the machine. The screen wall 35 follows roughly to a certain extent, though with an interspace or a gap 41, the outer contour of the moving parts. The screen wall is chosen with as little radial distance as possible to the rotation axes 21, 22 and, in other words, with the smallest possible lever arm and circumference, whilst, at the same time, the annular gap width, i.e. the distance of the screen wall from the rotating parts, must be sufficient to provide room for the boundary layer which is present due to adhesion conditions. In a typical example of the illustrated type of pump/motor, the gap width 41 can lie within the range 10-20% of the diameter of the generatrix of the rotating parts over the majority of the axial length of the wall. This range is valid for this example, given normal hydraulic fluid viscosity and a certain order of magnitude for the rotation speeds of a few thousand revolutions per minute. At the edges of the wall and at places where there are irregularities of shape, major deviations occur in gap width, for example in order to acquire rounded forms.

Figure 3:
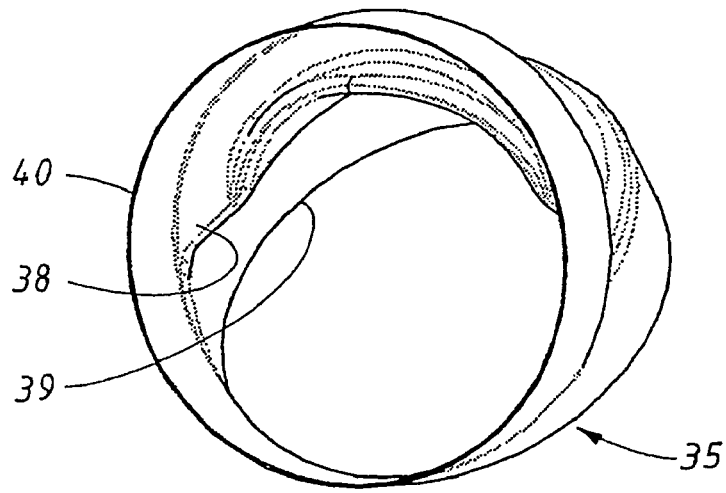
FIG. 3 is a perspective view of the device according to the invention in the second embodiment.
Figure 4:
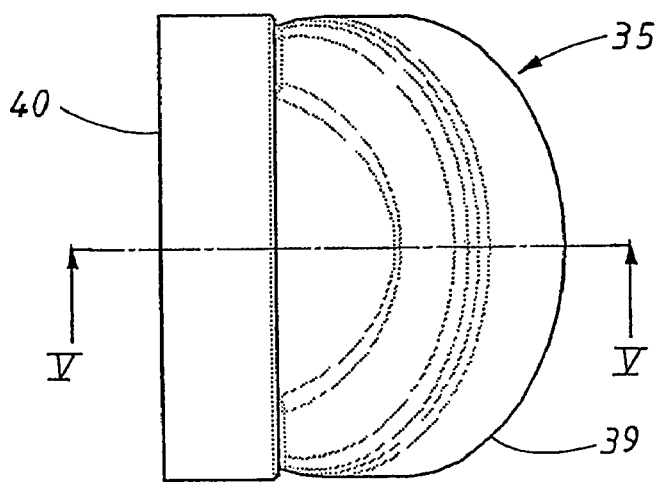
FIG. 4 is a side view of the device according to FIG. 3.
Figure 5:
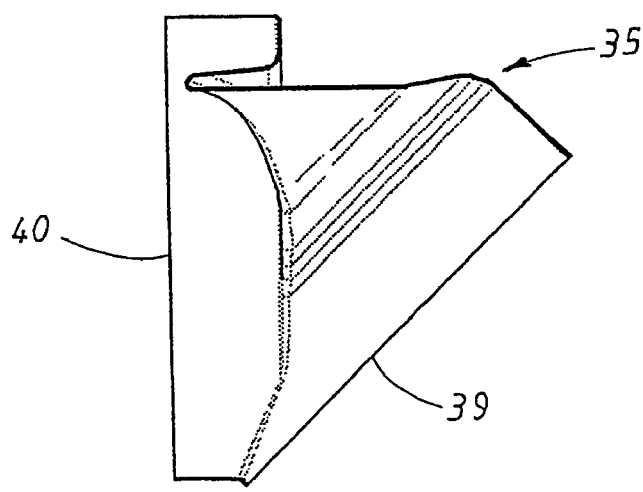
FIG. 5 is a section through the device along the line V-V in FIG. 4.

From the perspective view in FIG. 3 can thus be seen the basic shape of the screen member 35, which most simply resembles an angled pipe or a pipe bend of circular cross section and two circular peripheral edges 39, 40, facing away from each other, of which the one peripheral edge extends in a radial plane relative to the one rotation axis 21, whilst the other peripheral edge 40, i.e. its opening plane, extends substantially in a radial plane relative to the other rotation axis 22, though a certain angling may be expedient in practice.

Figure 6:
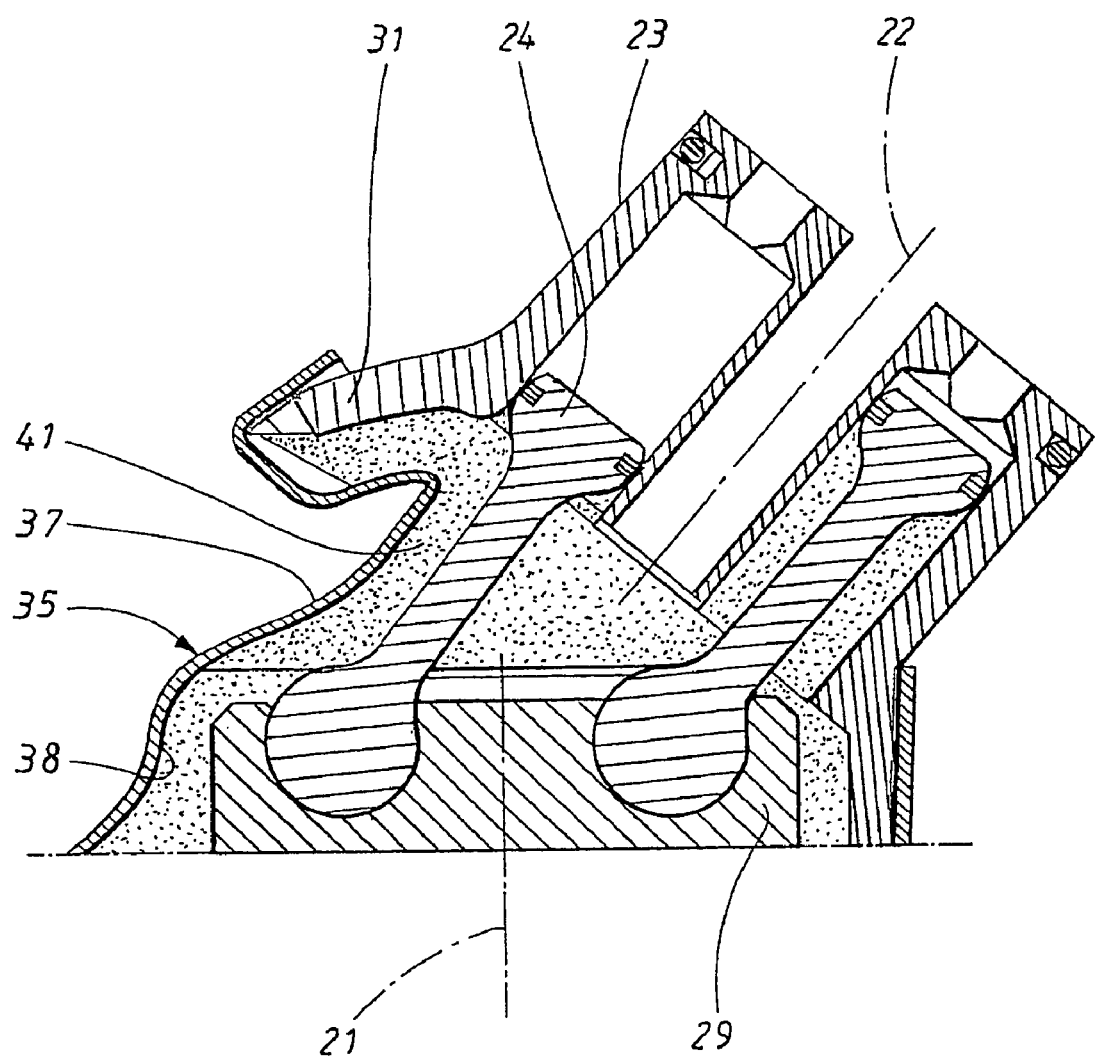
FIG. 6 is a partially cut section of a variant of the hydraulic pump/motor according to FIG. 2.

The partially broken view according to FIG. 6 is intended to show principally the volume of the inner part-chamber 37. As a result of the successive changing by the pistons of their axial position, over the revolution, in associated cylinder bores 25, the fluid volume will vary periodically over the revolution also on the rear side of the piston, i.e. that which forms part of the volume in the inner part-chamber 37. When the pistons slide into the bore, a larger fluid volume is thus required on this part of the revolution compared with that part of the revolution in which the pistons slide in to a lesser degree. On the other hand, the interspace between the driving pulley 29 and the cylinder drum 23 has a greater volume on that part of the revolution in which the pistons jut out most. Through optimal configuration of the screen wall 35, a complete equalization of these volume variations can almost be achieved, which otherwise create pulsating pressure variations over the revolution and thus are largely thereby equalized by means of the screen wall according to the invention. This is achieved, more precisely, by the area in an axial section through the inner part-chamber 37 being kept substantially constant throughout the revolution and is thus accomplished by choice of the extent of the screen wall, thereby reducing or eliminating a further source of energy losses. On the opposite side of the pistons 24 is found the hydraulic fluid, which either drives the pistons (motor) or is driven by the pistons (pump), but which, for the sake of clarity, is not marked in FIG. 6.

The invention is not limited to the examples which have been described above and illustrated in the drawings. It is conceivable, for example, for the outer part-chamber to have zero fluid volume, i.e. to be totally full, for example, or for the screen wall to be fully sealed against this part-chamber.

The inside of the housing can alternatively be configured and positioned such that the housing forms the smooth wall surface. Other variants of rotating hydraulic pumps or motors in which the invention can directly be applied are, for example, the "in-line" machine, which differs from the "bent axis" type in that the shaft of the cylinder drum and the drive shaft are coaxial, but in that its swash plate is instead angled to the drive shaft. The invention does not only function in a fixed-installation machine, for example having a horizontal rotation axis, but works regardless of axis inclinations, for example in a mobile installation.

While the present invention has been described with reference to a few specific embodiments, the description is illustrative, of the invention ad is not to be construed as limiting the invention. Various modifications may occur to those skilled in the art without departing from the true spirit and scope of the invention as defined by the appended claims.

The invention claimed is:

1. A device for reducing energy losses in a machinery unit (1), having at least one part (4, 6/23, 26, 29, 31, 32) which is arranged to rotate in fluid about a rotation axis (6/21, 22) in a substantially closed chamber (3/33) delimited in the radially outward direction by means of a wall (18/35) extending around said rotation axis, wherein said wall (18/35) has a radially inward facing wall surface (10/38) extending wholly or partially around said at least one part, said wall surface is a smooth low-friction surface against the fluid and extends close to, but with an interspace (41) to said at least one part, (4, 6/23, 26, 29, 31, 32), and wherein said interspace is suited to minimizing the rotating fluid volume and, at the same time, maintaining necessary width for a boundary layer formed in the fluid between said at least one part and said wall surface.

2. A device for reducing energy losses in a machinery unit (1), comprising at least one part (4, 6/23, 26, 29, 31, 32) which is arranged to rotate in fluid about a rotation axis (6/21, 22) in a substantially closed chamber (3/33), wherein a screening member (8/35), which extends in the form of a screen wall wholly or partially around said at least one rotary part and is arranged to divide said chamber into an inner part-chamber (14/37) and an outer part-chamber (13/36), the screen member having opposite open ends through which fluid may pass and including a low-friction inner surface the fluid in said inner part-chamber rotating with said at least one part in its rotation motion, and in said outer part-chamber (13/36), said fluid substantially is not jointly transported upon rotation of said at least one part.

3. A device for reducing energy losses in a machinery unit (1), having at least one part which is arranged to rotate in a fluid about a rotation axis (6/21, 22) in a substantially closed chamber (3/33) which is asymmetrical about said rotation axis, such that the volume of the chamber varies in the course of a rotation revolution, wherein by a screening member (18/35), which extends in the form of a screen wall around the rotary part and is arranged to divide the fluid chamber into an inner part-chamber (14/37) and an outer part-chamber (13/36), said inner part-chamber is delimited by a smooth screen surface of said screen wall and in which said fluid is allowed to rotate with said rotary part in its rotation motion, said screen wall further including opposite open ends each of which is defined by a circular peripheral edge, in said outer part-chamber said fluid is not jointly transported upon rotation of said rotary part, and said screen wall being situated such that the inner part-chamber is arranged to hold a fluid volume which is substantially invariable over said rotation revolution.

4. The device for reducing energy losses in a machinery unit of claim 3, further comprising;
   a hydraulic rotating axial-piston machine including a drive shaft (20); and
   a driving pulley (29) which is angled relative to longitudinal axes of the axial pistons (24) for cooperation with the axial pistons, which axial pistons are movable to and fro in their cylinder bores (25) in said rotary part, wherein said rotary part is a cylinder drum (23) rotatable about said rotation axis (22).

5. The device for reducing energy losses in a machinery unit of claim 4, wherein said drive shaft (20) and said rotation axis (22) of said cylinder drum (23) are angled relative to each other.

6. The device for reducing energy losses in a machinery unit of claim 4, wherein said screening member (35) is configured as an angled pipe having two circular open ends radially spaced from respective axes, one of the axes being said rotation axis, said axes of said circular open ends being angled relative to each other.

7. The device for reducing energy losses in a machinery unit of claim 6, wherein said screening member (35) is generally wedge shaped.

8. The device for reducing energy losses in a machinery unit of claim 6, wherein an edge defining one of the two circular open ends extends in a radial plane relative to said rotational axis.

9. The device for reducing energy losses in a machinery unit of claim 8, wherein said edge is a first edge and wherein a second edge defining the other of the two circular open ends extends in a radial plane relative to a rotational axis of said drive shaft.

10. The device for reducing energy losses in a machinery unit of claim 3, wherein each of said circular peripheral edge having a diameter that is at least as large as a diameter of said smooth screen surface.

* * * * *